United States Patent [19]
Ort

[11] Patent Number: 6,043,828
[45] Date of Patent: Mar. 28, 2000

[54] METHOD AND APPARATUS FOR HANDLING PROPRIETARY AND NON-PROPRIETARY FORMATTED COMPACT DISCS IN THE SAME VIDEO PLAYBACK SYSTEM

[75] Inventor: Jeffrey Ort, Kirkland, Wash.

[73] Assignee: Cirrus Logic, Inc.

[21] Appl. No.: 08/623,808

[22] Filed: Mar. 29, 1996

[51] Int. Cl.[7] .................................................... G06F 15/00
[52] U.S. Cl. ...................... 345/501; 369/275.3; 709/301
[58] Field of Search ........................... 345/302, 501–503; 348/552; 369/69, 70, 84, 92, 272, 273, 275.1, 275.3, 280; 386/109, 112, 125, 126; 395/680, 682, 685; 709/300, 301, 302, 305

[56] References Cited

U.S. PATENT DOCUMENTS

| | | | |
|---|---|---|---|
| 5,301,172 | 4/1994 | Richards et al. | 369/32 |
| 5,432,801 | 7/1995 | Hepler | 371/37.4 |
| 5,506,954 | 4/1996 | Arshi et al. | 345/501 |
| 5,542,023 | 7/1996 | Sakai et al. | 345/302 |
| 5,642,171 | 6/1997 | Baumgartner et al. | 348/515 |
| 5,687,160 | 11/1997 | Aotake et al. | 369/275.3 |
| 5,699,360 | 12/1997 | Nishida et al. | 370/503 |
| 5,701,384 | 12/1997 | Park | 386/70 |
| 5,721,724 | 2/1998 | Taira et al. | 369/275.3 |

*Primary Examiner*—Ulka J. Chauhan
*Attorney, Agent, or Firm*—James J. Murphy, Esq.; Steve Shaw

[57] ABSTRACT

A method and apparatus for handling both proprietary and non-proprietary formatted compact discs in the same video playback system. In one embodiment, the audio and video data signals are in a Moving Pictures Expert Group (MPEG) format. Portions of the novel system operate within a high level format independent software library and portions of the novel system operate within a low level software driver of the playback system that receives disc information from a proprietary or non-proprietary disc present to the playback system to be played. The novel system of the present invention includes a disc format determinator for checking the data contained on a disc to see if it includes proprietary information specific to the playback system. In the present invention the proprietary information may be either VideoCD or CD-I disc format information. If a disc presented to the playback system is formatted for a non-proprietary disc format i.e., VideoCD or CD-I, the disc format determination procedure configures the disc in order to enable the playback system to read and playback information contained on such a disc.

20 Claims, 6 Drawing Sheets

METHOD AND APPARATUS FOR HANDLING PROPRIETARY AND NON-PROPRIETARY FORMATTED COMPACT DISCS IN THE SAME VIDEO PLAYBACK SYSTEM

FIELD OF THE INVENTION

The present invention relates generally to the field of multimedia systems. More particularly, this invention relates to a disc handling software program for interfacing a VideoCD format compact disc and a compact disc interactive (CD-I) format disc in a conventional multimedia computer system. The invention may be particularly suited for the Motion Picture Expert Group's (MPEG I+II) data compression and decompression standards.

BACKGROUND OF THE INVENTION

The advent of substantial hardware improvements combined with standardized audio and video software applications has allowed the use of complex audio and video functions in even the most common multimedia computer applications. Personal computer systems have been adopted to run multimedia software applications which include audio and video information. Several multimedia specification committees have established and proposed standards for encoding/compressing and decoding/decompressing audio and video information. MPEG I and II established by the Motion Picture Expert Group, are the most widely accepted international standard in the field of the multimedia personal computer software applications In addition to finding easy software solutions to the vast number of multimedia system available, system designers continually search for solutions that would make using these multimedia system as easy and as less expensive as possible. Some of these hardware solutions include integrating compact disc drives into many multimedia system to provide audio and video capabilities to these multimedia systems.

To enable compact disc capabilities in many of these multimedia systems, the compact disc industry has established certain format standards for the data stored on discs utilized in these multi-media systems. These data formats are typically defined by their "Color" Book Specification (e.g., Red, Book, Green Book, White Book, etc). These standards are used as the basis for which the compact disc drive may use and interpret data stored in a disc. From these "Color" Book Specification, several other disc standard formats have evolved.

Among these standards is the Yellow Book standard developed in 1984 by Philips Corporation and Sony Corporation (herein incorporated by reference). The Yellow Book is an extension to the Red Book to add the ability to store computer data, as well as other compressed audio/video picture data. Another standard specifically defined by Philips in its Green Book Specification (also herein incorporated by reference) is the CD-I format. The CD-I format is intended to run on proprietary hardware under the CD-RTOS operating system. A CD-I playback system can handle compressed audio, graphics, and full motion video data in an interactive real time manner.

Yet another disc specification defined by Philips is the White Book Specification. The White Book SPEC defines a disc format which uses a "bridge disc" format to allow a disc to be played on both a CD-I player and a VideoCD player. Included in the White Book SPEC is the VideoCD disc format which defines video data compression and decompression for a VideoCD compact disc player.

Despite the various disc standards developed by Philips Corporation and Sony Corporation, these standards lack true compact disc compatibility of the various compact disc players which play these different format discs. Thus, for example, a CD-I format disc could not be played on a VideoCD based player, and alternatively, a VideoCD format disc could not be played on a CD-I based player. The lack of compatibility often means that system users have to purchase proprietary hardware with each different disc format e.g., a CD-I disc drive for CD-I formatted discs.

FIG. 1 is a simplified block diagram illustrating a prior art system's handling of CD-I and VideoCD formatted discs in a computer system. The computer system shown in FIG. 1 includes a system bus 102 for communicating information, a central processing unit (CPU) 110 coupled to system bus 102 to process information, main memory 120 coupled to system bus 102 to store data and instructions processed by CPU 110, storage unit 125 coupled system bus 102 to store data.

Computer system 100 further includes video processor 135 coupled to system bus 102 to process video data, and display device 140 coupled to system bus 102 to display video and graphics images. Computer system 100 may further include either VideoCD interface 150 or CD-I interface 160 depending on the type of disc format that computer system may be adapted to handle.

Accordingly, if computer system 100 is designed to handle VideoCD format discs, VideoCD interface 150 is coupled to system bus 102 to handle VideoCD formatted disc 155. Alternatively, if computer system 100 is designed to handle CD-I formatted discs, CD-I interface 160 is coupled to system bus 102 to handle CD-I formatted disc 165. A system setup as shown in FIG. 1 does not allow a computer user to play VideoCD formatted disc in a system configured for CD-I formats or the vice versa. The incompatibility of the two different disc formats in the same computer system result in system users having to switch hardware or purchase separate hardware to play the various disc formats.

To solve the incompatibility problems with the various disc formats, Philips has developed a bridging format disc known as the CD-bridge Disc to allow a CD-I player to play both CD-I format disc and a VideoCD format disc. However, the CD-bridge format does not solve the problem of the inability to play discs with either the CD-I or VideoCD formats in a conventional multi-media computer system running a conventional operating system such as MSDOS or MSWindows developed by Microsoft Corporation.

The inability to play the different formatted discs from either Philips and Sony prevents conventional multimedia system users from enjoying a catalog of video and audio discs from these companies. Additionally, users with incompatible multi-media systems end up spending extra sums of money to purchase proprietary add-on hardware to traditional multi-media systems to enable these systems play the variety of different format discs.

Accordingly, improvements to conventional multimedia computer systems which overcome VideoCD and CD-I formats incompatibility problems of the prior art is presently desired.

SUMMARY OF THE INVENTION

The present invention provides a software solution to allow conventional multimedia computer system running operating systems such as MSDOS play a variety of differently formatted compact disc in the same compact disc drive.

A preferred embodiment of the software solution of the present invention includes a low level compact disc format independent library which includes provides an interface between a low level hardware dependent driver and a compact disc interface. The low level disc format independent library provides a relatively low interface which enables a variety of compact disc format types to communicate with a high level format dependent applications programs. By providing the low level format independent capabilities, the present invention provides a system that is readily adaptable to different format compact discs hardware without requiring modifications to the low level libraries which support these hardware.

Specifically, embodiments of the present invention include a computer system having a processor coupled to a bus; a memory unit for storing information which operate in conjunction with the processor; a video processing capable of processing Motion Picture Expert Group (MPEG) standard instructions; a high level format independent library for dynamically configuring various compact disc format for playback by the video processor; and a low level hardware dependent procedure executed by the processor for processing hardware dependent output data structures to generate therefrom microinstructions for the video processor.

Embodiments of the present invention further includes the above and wherein the high level format independent library includes tracking procedures for processing track and related information contained in a disc and wherein the tracking procedures further interface with the low level driver to download disc format specific information to the video processor for playback. The high level format independent library further includes a programmable link list procedure for configuring disc information for the high level disc dependent application programs. The link list procedure interfaces with the low level driver to configure and reconfigure new disc information not present in the high level format independent library.

Embodiments of the present invention further include the above and a compact disc extension routine which is contained in the low level hardware dependent library. The extension routine enables the high level disc format independent library to interrupt the video processor to simulate the processing of information contained in a compact disc in real mode in the computer system's memory.

Advantages of the present invention include enabling a conventional computer system to be configured to handle a variety of compact disc formats without the addition of extra hardware. The present invention also provides the advantage of giving the user the flexibility of using hardware designed to handle a specific format compact disc type to play a compact disc of a different format type. The present invention further has the advantage of allowing the computer system to automatically and transparently configure a computer system to handle the various disc format type without any user intervention or manual configuration of hardware jumpers etc., as is the practice in the prior art.

BRIEF DESCRIPTION OF THE DRAWING

The various features and advantages of the present invention will become apparent from the following detailed description taken in conjunction with the accompanying drawings, wherein like references numerals designate like structural elements, and in which.

Corresponding numerals and symbols in the different figures refer to corresponding parts unless otherwise indicated.

DESCRIPTION OF THE PREFERRED EMBODIMENTS

The making and use of the presently preferred embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not delimit the scope of the invention.

NOTATION AND NOMENCLATURE

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art, a procedure, logic block, process, etc., is herein, and generally conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits values, elements, symbols, characters, terms, numbers, or the like with reference to the present invention.

It should be borne in mind, however, that all of these terms are to be interpreted as referencing physical manipulations and quantities and are merely convenience labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining", or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 1:
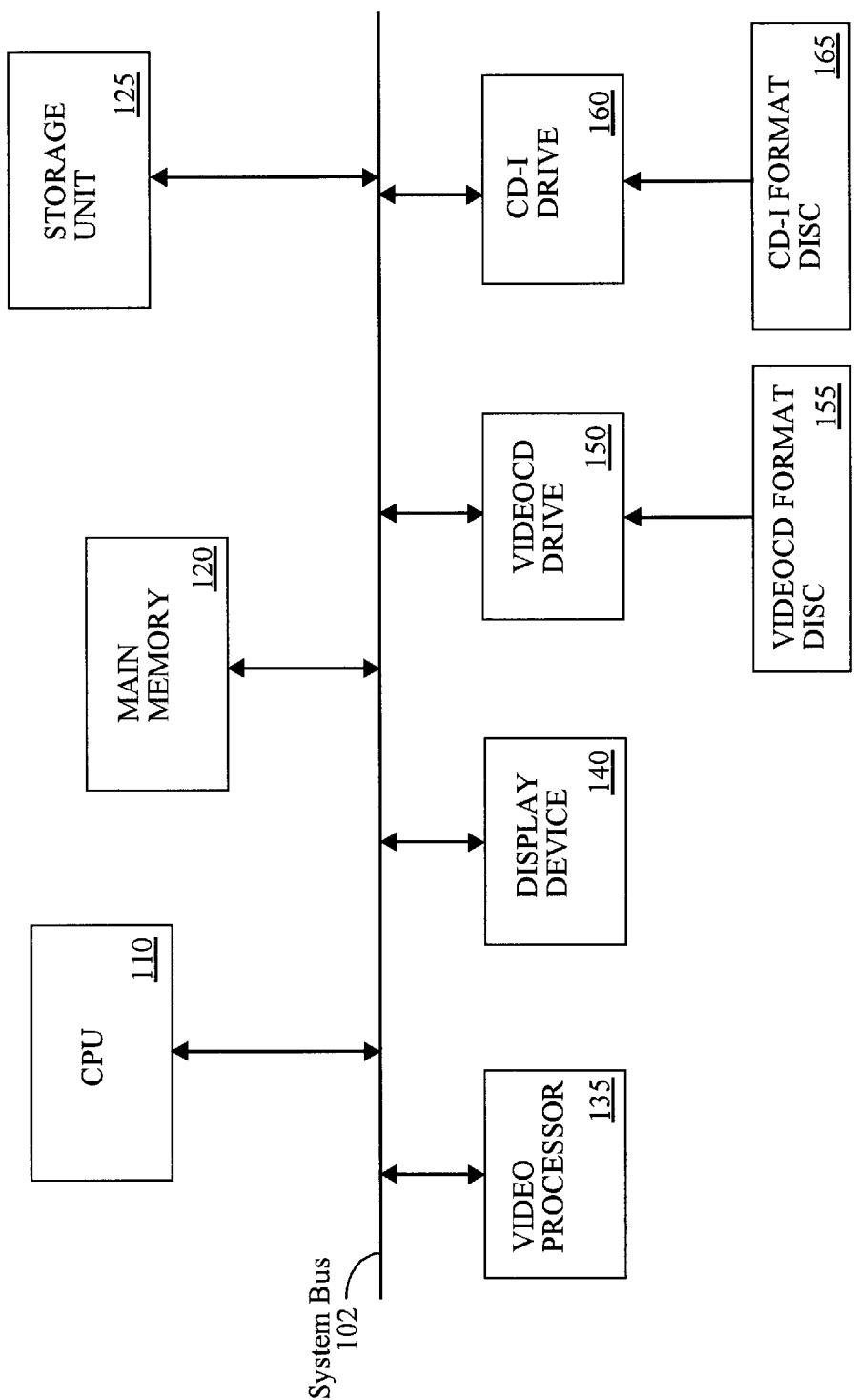
FIG. 1 is a block diagram of a simplified prior art computer system including a video processor, a central processing unit, and optional VideoCD or CD-I interfaces.
Figure 1B:
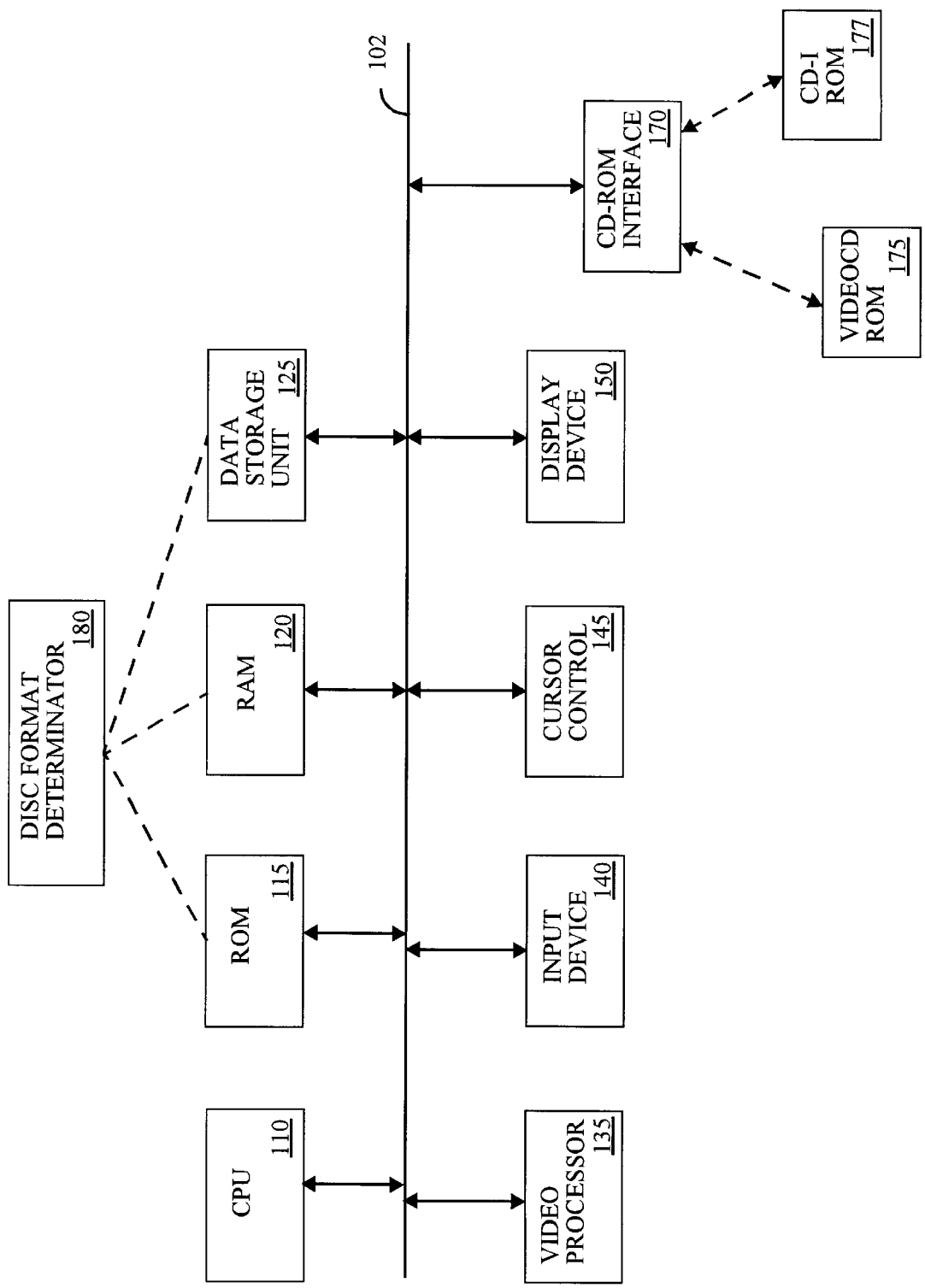
FIG. 1B is a simplified block diagram of a computer system of the present invention including a disc format determination unit, a CD-ROM drive with the capability of playing either a VIDEOCD or CD-I formatted discs.

Referring now to FIG. 1B, a simplified block diagram of a computer system of the present invention is shown. Computer system 100 of FIG. 1B is exemplary only, and the present invention may operate within a number of different computer systems including general purpose computer systems, and computer systems specially adapted for graphics/video display which may or may not comprise the same elements interrelated in the same manner as illustrated in FIG. 1B.

Computer system 100 includes an address/data bus 102 for communicating information, a central processing unit (CPU) 110 coupled to bus 102 for processing information and instructions, a main memory 120 which may be implemented as a dynamic random access memory (DRAM) or the like coupled to bus 102 for storing information and instructions for CPU 110. Computer system 100 may also include disk storage device 125 coupled to bus 102 for storing information and instructions, display device 140 coupled to bus 102 for displaying information to a computer user, video/graphics processor 135 coupled to bus 102 to compress and decompress video data.

Video processor 135 is coupled to bus 102 to receive and process video data in computer system 100. Video processor 135 also plays back video data from the various video format discs in computer system 100 for display to display device 140. Computer system 100 further includes Compact Disc read-only memory (CD-ROM) interface 170 coupled to bus 102 to interface audio/video compact discs to computer system 100. CD-ROM interface 170 interfaces CD-ROM discs with audio/video formats including CD-I format disc 177, VideoCD format disc 175 and other conventionally formatted discs to computer system 100.

The present invention includes a transparent disc format determinator software 180 which may be stored in main memory 120, Read-only memory (ROM) 115, or storage unit 125 to enable computer system 100 playback any of the variety of formatted CD-ROMs received by CD-ROM interface 170. System 100 may optionally include a signal generating device 145 coupled to bus 102 for communicating command selections to CPU 110.

The display device 140 of computer system 100 may be a liquid crystal device, cathode ray tube, or other display device suitable for creating graphics and video images and alphanumeric characters to the computer user.

Figure 2:
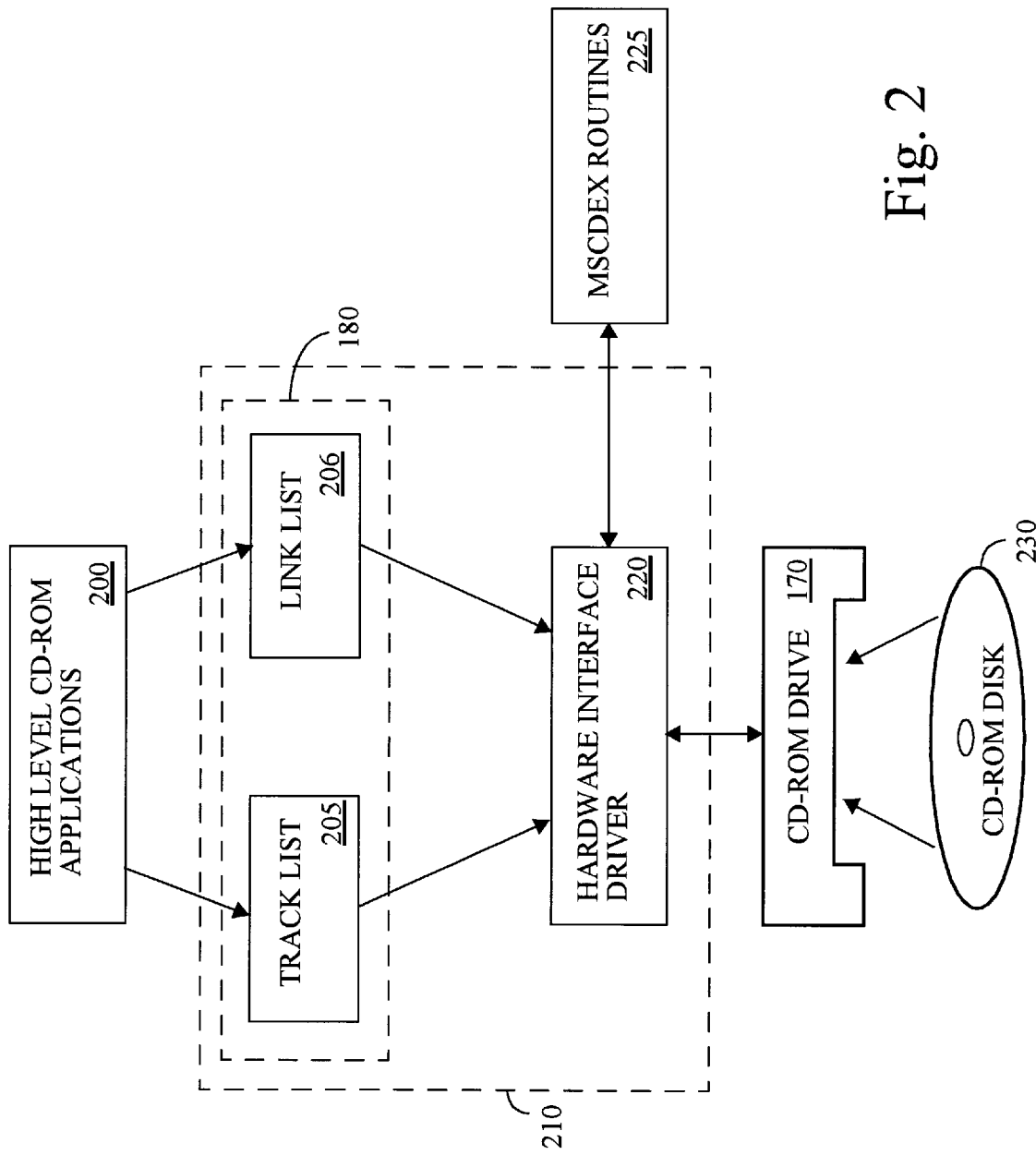
FIG. 2 is a diagram illustrating the logic layers between the software and hardware components of the computer controlled compact disc software program of the present invention including different layers of the software interface to a compact disc drive.

Referring next to FIG. 2 is a logical representation of the functional layers of a computer controlled graphics/video display system in accordance with the present invention. The functional layers shown in FIG. 2 include High Level CD-ROM Applications (HCDA) 200, Media Control Interface driver (MCI) 210, CD-ROM interface 170, and CD-ROM hardware 230. MCI 210 includes Disc format determinator (DFD) 180 which includes high level Track Listing Library (TLL) 205 and high level Link Listing Library (LLL) 206, and hardware interface driver (HID) 220. Apart from CD-ROM drive 170 which may be implemented as a hardware, the remainder of the functional layers of FIG. 2 are implemented as executable instructions within computer system 100 (FIG. 1B) and may reside in main memory 120, Read-Only Memory (ROM) 115, or storage device 125.

High Level Compact Disc Application (HCDA) 200 includes executable routines which may require generating video images with accompanying audio on display device 140. HCDA 200 may be any "off-the-shelf" compact disc application programs which may be permanently stored in storage device 125 or main memory 120. HCDA 200 may also be loadable on main memory 120 during a normal operation of computer system 100. The executable routines of HCDA 200 interfaces with video processing procedures in DFD 180 by requesting certain disc information including track and content listing information contained in a compact disc presented to computer system 100.

DFD 180 includes track listing routines (TLL) 205 and link listing routines (LLR) 210. DFD 180 interfaces with HCDA 200 to provide track and sector information contained in a compact disc to HCDA 200 when a disc is being played in computer system 100. A sample of LLR 210 is illustrated in Appendix 1. In the prior art, DFD 180 is implemented as a hardware dependent routine for each compact disc format supported by the underlying compact disc hardware CD-ROM interface 170.

According to the preferred embodiment of the present invention, the compact disc decoding procedures of DFD 180 and their input and output data are format independent. Consequently, computer system 100 (FIG. 1B) may be able to handle any compact disc format once the disc format has been decoded by DFD 180. DFD 180 interfaces with and controls a low level driver 220. The control is executed through TLL 205 and LLL 206. In one embodiment of the present invention, the low level driver 220 is a media control interface (MCI) type driver developed by Microsoft Corporation. The HID 220 of the present invention includes low level function calls to the hardware units (e.g., CD-ROM interface 170) and other low level software routines (e.g., MSCDEX routines 225) to control video playback of selected video/audio tracks by the video processor 135.

TLL 205 includes executable routines to maintain a list of the number of tracks present on a presently supplied disc in computer system 100. The Track listing information is supplied by TLL 205 to decoding routines in DFD 180 to be decoded in order for DFD 180 to determine the number of tracks, sector, length, and volume information contained on a disc.

LLL 206 includes executable routines to link information contained in CD-ROM 230 with the disc format determination routines in DFD 180 for decoding. The information presented to LLL 206 includes the disc type of a compact disc presented to computer system 100. The information may also include a variety of format information that DFD 180 may support.

LLL 206 further takes the information from TLL 205 and uses that information to create a link list of data structures for each track contained in a disc. The disc information may include the length of a track, the beginning and ending points of a track on a disc. LLL 206 provides other functionalities to a user of computer system 100. These functionalities may include allowing the user to perform random playback of tracks, reshuffling of tracks, auto-repeating, and skipping of tracks. Once LLL 206 is created, the list is down loaded into MPEG buffers in main memory 120 and written to video processor 135 for playback.

LLL 206 begins operation by initiating an MSCDEX request routine to HID 220 to determine the type of disc inserted into CD-ROM drive 170. The MSCDEX request is followed by executing an interrupt routine to interrupt MSCDEX 225 for real mode simulation to read data from CD-ROM 230. LLL 206 then performs a "fill in request" to read data from CD-ROM 230. The information read from disc 230 is used to create the data structures needed by LLL 206 to configure and allow format compatibility for a disc accepted by CD-ROM interface 170.

Still referring to FIG. 2, the output of DFD 180 interfaces with the HID 220 to control the supply of MPEG data to the video processor 135 (FIG. 1B). Specifically, the video processor 135 signals the MCI driver 220 with threshold low interrupt signals to cause the HID 220 to control MPEG information flow to the video processor 135. MCI driver 210 includes Microsoft Compact Disc Extension routines (MSCDEX) to interface DFD 180 to a variety of disc formats.

In the preferred embodiment of the present invention, HID 220 interfaces with LLL 206 to allow computer system 100 of FIG. 1B to support a variety of disc formats. Communication protocols between HID 220 and LLL 206 also allow plug and play capabilities in computer system 100 in such a way that a compact disc inserted in CD-ROM drive 170 may be automatically configured without any manual user intervention. Since HID 220 is a low level hardware driver, it can be readily be redesigned for implementation with a variety of different disc format by modifying of the high level applications program 200.

Figure 3:
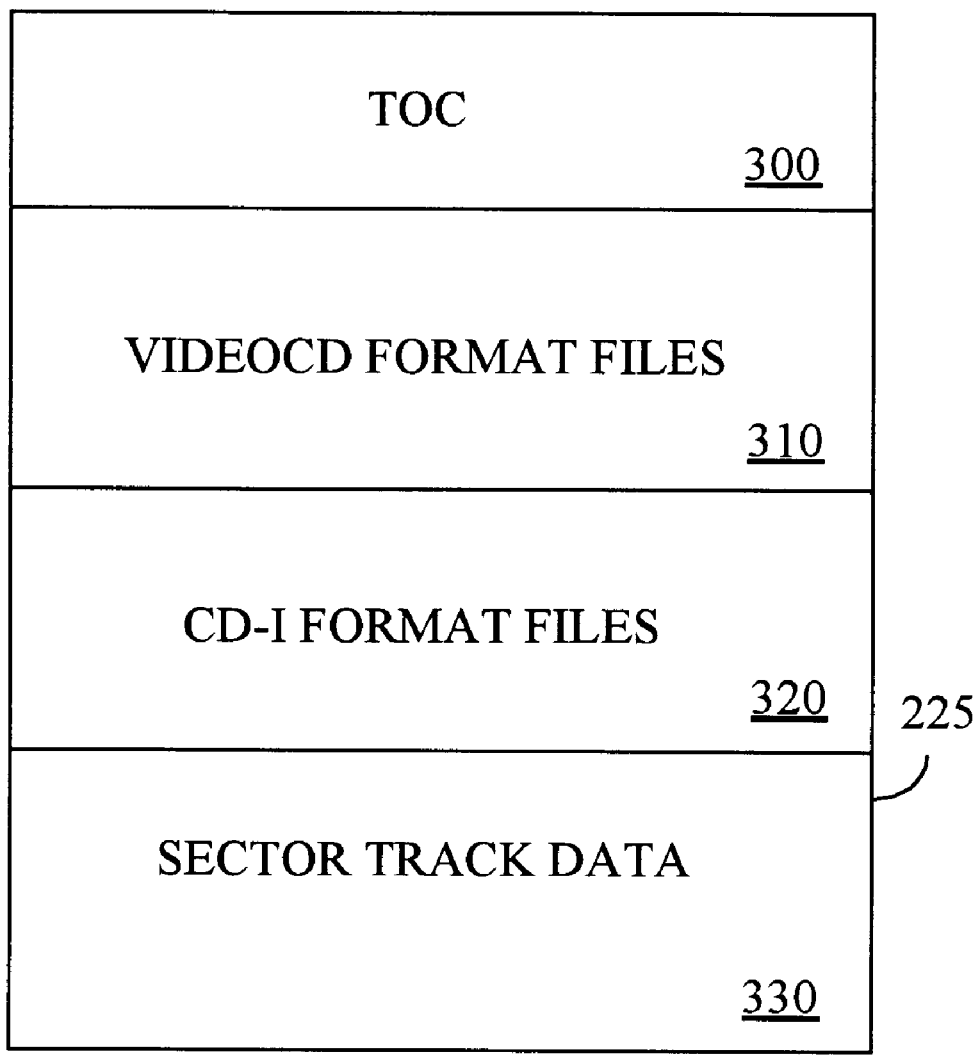
FIG. 3 illustrates data storage locations of a compact disc of the present invention.

FIG. 3 is a block diagram illustrating the contents of CD-ROM 230 of the present invention. The information contained in CD-ROM 230 includes a table of content (TOC) 300 which includes the track, sector, size, and the beginning and ending points of each track and sector. TOC 300 may also include volume information for multi-volume video discs. TOC 300 is used by TLL 205 in creating the data structures utilized by LLL 206 in ensuring disc format compatibility in computer system 100.

CD-ROM 230 also includes format information which contains format specific files and directories which may be used by LLL 206 in determining the format type of a disc being used in computer system 100. In the preferred embodiment of the present invention, the format files may include files such as a VideoCD.info file which contains information of the contents of a VideoCD format disc, or a CD-I.info file which contains information pertinent for CD-I formatted discs. The format files may also contain information indicating the number of tracks per disc and the length of each track and sector on the disc.

Although the information contained in the format files sector of a disc may be unique, and specific to a particular disc designer, the LLL 206 of the present invention is able to decode the information contained in these file regardless of the designer and format to make the disc compatible with computer system 100, by reading data and parsing the data for known formats and branching on the code accordingly CD-ROM 230 further includes sector track data information 330 which includes information describing the number of sectors, the length in bytes of each sector, and other relevant sector information on each disc.

Figure 4:
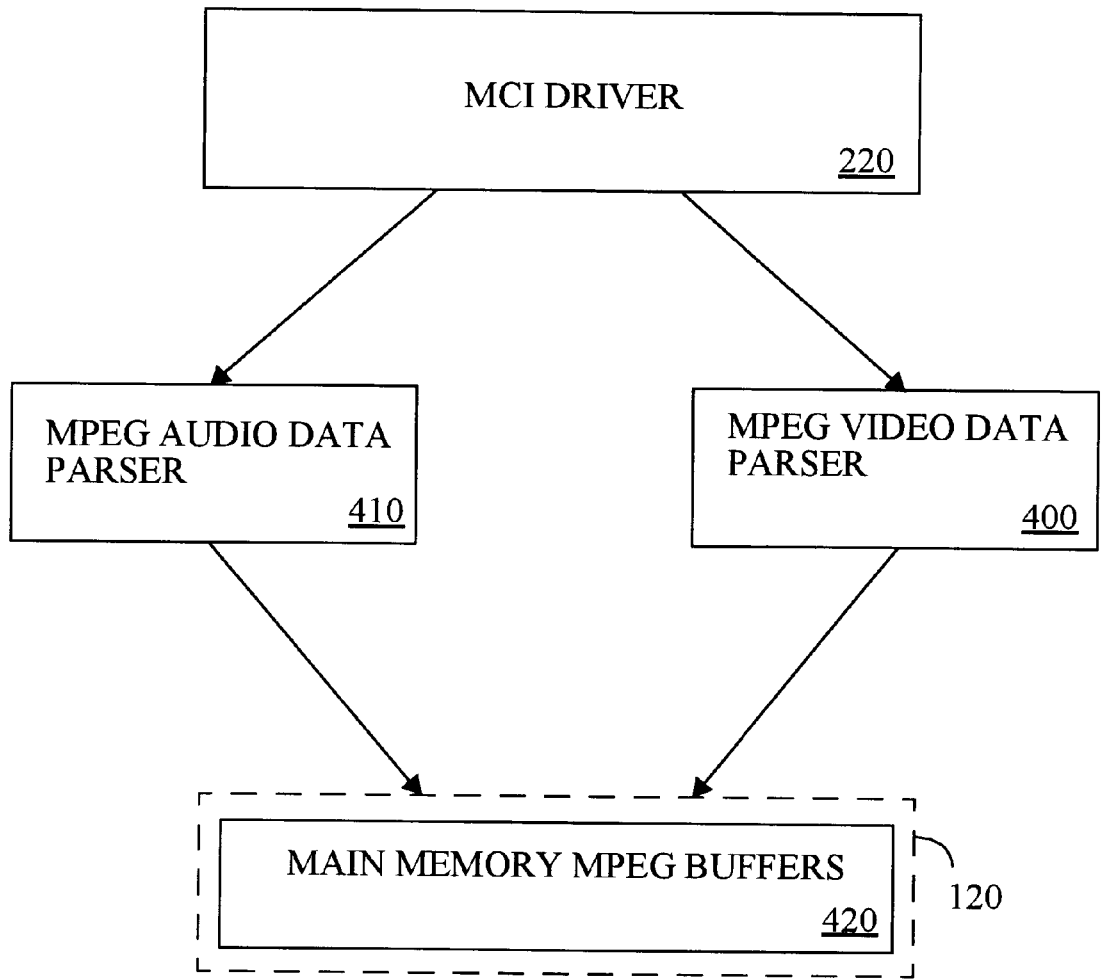
FIG. 4 is a diagram illustrating the logical layers between the software and hardware elements of the MCI driver of the present invention.

FIG. 4 is a block diagram of an exemplary representation of the logic layers of HID 220. HID 220 includes MPEG Video data parser (MVDP) 400 and MPEG Audio Data Parser (MADP) 410. MVDP 400 is a decoding and parsing routine utilize by MCI 220 to decode and parse out video data in a stream of data received in MCI 220 from CD-ROM 230. MVDP 400 decodes the stream of data to parse out valid MPEG video data which is then loaded into host memory MPEG buffers 420 in host memory 120.

MADP 410 is an audio decoding and parsing routine which enable HID 220 to decode and parse out audio data contained in the stream of data presented by CD-ROM 230. The parsed out audio data is subsequently loaded into host memory MPEG buffers 420. The parsed out valid MPEG data from the stream of data from CD-ROM 230 of FIG. 4 is down loaded from host memory MPEG buffers 420 to the MPEG video processor 135 of FIG. 2 to begin playback. In the preferred embodiment of the present invention, the validity of MPEG data in the stream of data 501 from CD-ROM 230 is determined by looking for one of two marker codes identifying the data to be system or video data.

Figure 5:
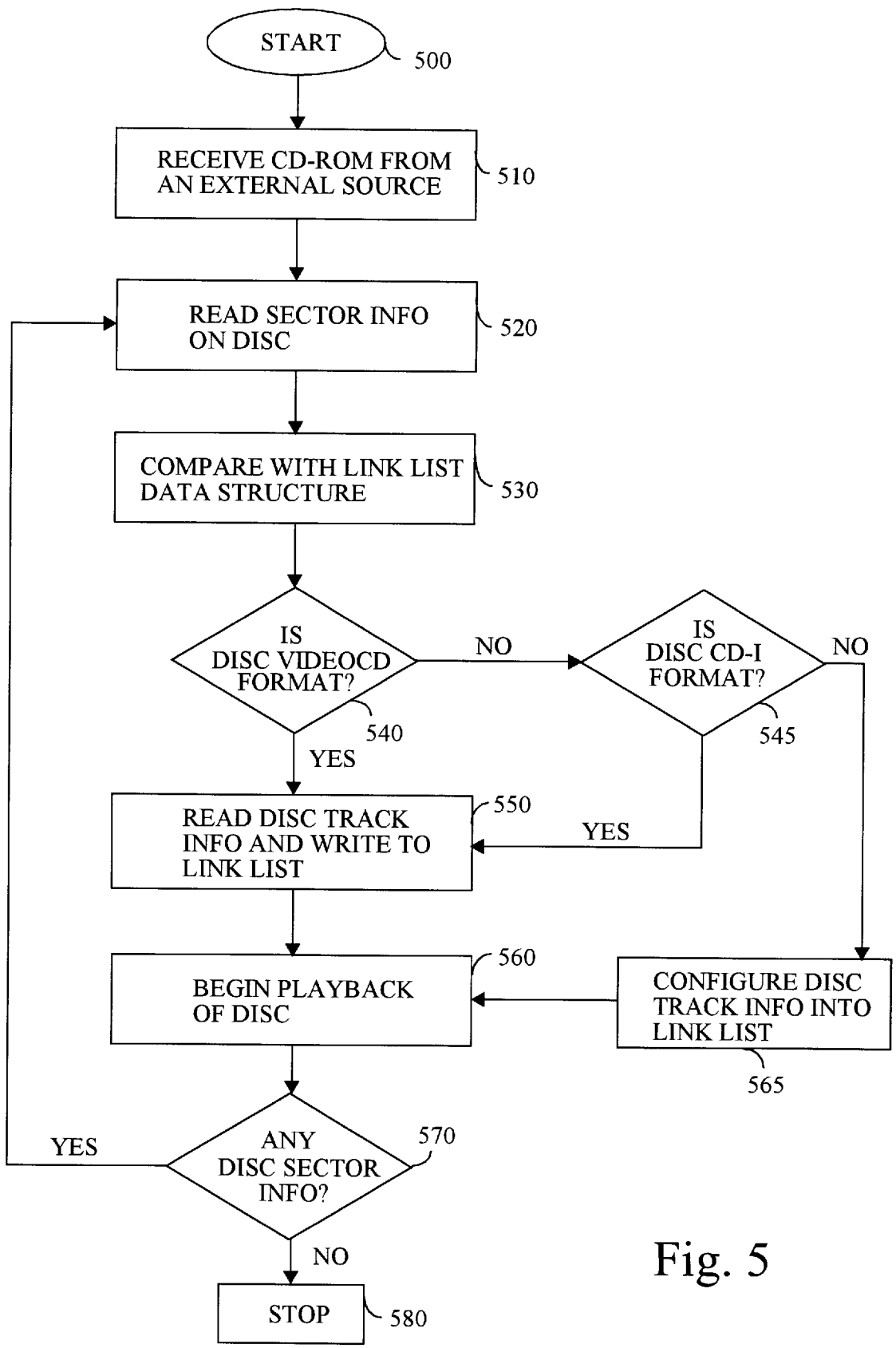
FIG. 5 is a flow diagram of a process of the present invention for programming the computer system of the present invention to handle differently formatted compact discs.

FIG. 5 is a flow diagram illustrating the disc formatting procedure of the preferred embodiment of the present invention. Procedure 500 is implemented each time a computer user of the present invention plays a VideoCD or CD-I format disc. At block 510 when a disc is inserted into CD-ROM drive 170 the MCI driver 220 initiates interfacing with the compact disc by accessing information contained in the table of contents (TOC 400).

At block 520, MCI-Driver 220 reads sector information from the disc. In the preferred embodiment of the present invention, information contained in sector index 150 is read from the disc using MSCDEX 225 low DOS memory executing a real mode interrupt. The information from this sector is checked to determine whether a string which indicates the format type of a disc is present.

At block 530 the MCI driver 220 compares the contents of the TOC 300 with the contents of LLL 210 to determine wether the data structure of the disc matches that contained in the LLL 210. If the information contained on a disc does not match the data structure of the LLL 210, the MCI driver 220 configures the LLL 210 with the information contained on the disc.

At block 540, the MCI-Driver determines whether the format type is a VideoCD format. If the disc format type is VideoCD, processing continues at block 550. If, on the other hand the disc format type is not VideoCD, processing continues at block 545 where the MCI driver 220 determines whether the format type is CD-I.

At block 550, the MCI-Driver 220 reads the track information from the disc supplied if the disc format is either VideoCD or CD-I. The information read from the disc is written to LLL 210 for compilation to HLCDA 200. The information from LLL 210 is passed on to box 565.

At block 560, the track and link list information from HCDA 180 is down loaded to the MPEG buffers in host memory 120 to be down loaded to the video processor 135 to begin playback of the information stored on the CD-ROM disc. If the format information read from a disc is neither VideoCD nor CD-I format, then the disc information from the non-VideoCD or CD-I format is configured into LLL 210 to be played-back by the video processor 135 where possible.

At block 570, the MCI-Driver 220 checks to determine whether there is any more sector information to be read from a disc. If there is any more sector information processing continues at block 520. If there is no more sector information to be read from a disc, processing ends at 580.

Exemplary high level disc format independent library data structure

The following basic field types are defined:

int 32 bit signed integer

DWORD 32 bit unsigned integer

WORD 16 bit unsigned integer

Char

Bool true (1)/false (0)

The TLL 205 functions as the track and sector information gathering layer where the high level sector and track information are processed. Track and sector information requests are made by the low level MCI driver 220 from the compact disc unit. An exemplary request procedure in the DFD 180 is presented below:

read_prot→rw1_rqh.rqh_len=size of (ReadWriteL_Hdr);

read_prot→rw1_rqh.rqh_cmd=0'80; //128 read long cmd read_prot→rw1_rqh.rqh_status=0;

read_prot→rw1_addrmd=0×00; //HSG addressing read_prot→rw1_xfer=buff_real;

The above is a portion of the fill in read request routine of the DFD 180 for filling read requests from the MCI driver 220. Data fill read requests by the MCI driver 220 are handled by the MSCDEX 225. To initiate MSCDEX requests, the MSCDEX routines are executed by the MCI driver 220. An exemplary portion of the MSCDEX request procedure is shown below:

real_regs.Cx=first_DrvLetter;

real_regs.Ax=0×1510; *initiate MSCDEX requests* reg=(Real_Regs far *) & (real_regs);

asm{ mov ax,0300h;

les di,reg mov bx,002fh; * MSCDEX interrupt for real mode simulation*

The above procedure initiates MSCDEX requests by the MCI driver and interrupts the video processor to allow for real mode simulation in the low DOS memory of memory 120.

Thus, a method and apparatus for dynamically and automatically configuring a variety of compact disc format type to played on the same computer system without having to use hardware specifically designed for such format type. From the above description, it will be apparent that the invention disclosed herein provides a novel and advantageous method and apparatus for using conventional a computer system to playback a variety of compact disc formats. The foregoing discussion discloses and describes exemplary method and embodiments of the present invention. As will be understood by those familiar with the art, the invention may be embodied in other specific forms without departing from its spirit or essential characteristics, and thus, the described embodiment is not restrictive of the scope of the invention. For example, the invention could be used with any host processor platform, including Intel's X86 processor architecture, the Power PC, DEC Alpha, etc., and could be used with any processor instruction set. The following claims are indicative of the scope of the invention. All variations which come within the meaning and range of equivalency of the claims are to be embraced with their scope.

What is claimed is:

1. A multimedia computer system comprising:
   (a) a central processing unit coupled to a bus;
   (b) a video processor coupled to said bus for processing video/audio data, said video processor executing instructions compatible with the Motion Picture Expert Group (MPEG) standards;
   (c) a memory unit coupled to said bus for storing information;
   (d) a compact disc unit coupled to said to bus for receiving a multimedia compact disc read only memory disc (CD-ROM), said compact disc read only memory disc containing a specific format type information in a format files sector identifying a format type for information stored on said disc;
   (e) a high level compact disc library comprising hardware independent video/audio processing procedures for processing video/audio processing requests from a high level compact disc application programs to produce compact disc format independent output data structures to said video processor by decoding said format type information, wherein said high level compact disc library is compatible with a variety of differently formatted compact disc read-only memory discs; and
   (f) a low level hardware dependent library executed by said central processing unit for processing said hardware independent output data structures to generate microinstructions for said compact disc unit and writing said specific format information from said disc in said high level library.

2. The system of claim 1 wherein said high level compact disc library comprise a track listing procedure for maintaining and determining track information present on said multimedia CD-ROM disc, wherein said track information is passed to said high level compact disc applications program to generate microinstructions to said video processor for processing.

3. The system of claim 2 wherein said high level compact disc library further comprise a programmable link list procedure for linking information contained in said CD-ROM disc with a disc format information determination routine in said high level compact disc library, wherein said programmable link list procedure provides a programmable means for setting the order of track playback of tracks in said CD-ROM disc.

4. The system of claim 3 wherein said programmable link list procedure further provides a programmable means for random selectability of track information in said compact disc read only memory disc.

5. The system of claim 4 wherein said low level hardware dependent library includes an MPEG video data parser for parsing video data instructions present in said microinstructions.

6. The system of claim 5 wherein said low level hardware dependent library further includes an MPEG audio data parser for parsing audio instructions contained in said microinstructions.

7. The system of claim 6 wherein said variety of different format discs includes a VIDEOCD format disc.

8. The system of claim 7 wherein said variety of different format discs further includes a Compact Disc interactive (CD-I) format.

9. A video playback system for playing back audio and video signals of an MPEG format, said playback system including a computer system and further comprising:
   a) a processor coupled to an address/data bus;
   b) a random access memory unit coupled to said bus for storing information;
   c) a compact disc read only memory driver coupled to said bus for handling a variety of different format compact discs;
   d) a video processing unit coupled to said bus for processing hardware independent instructions in a high level video library and, in response thereto, generating video images and accompanying audio to a display screen;
   e) said high level video library having hardware independent video data processing procedures executed by said video processing unit, said hardware independent video data processing procedures for receiving video processing requests from a high level video application program and for generating hardware independent microinstructions to said video processing unit, said high level video library including a link list for decoding format files received from said driver for generating said hardware independent microinstructions; and f) a low level hardware dependent Library executed by said processor for receiving hardware specific information from said CD-ROM drive, said low level hardware dependent library for reading information contained in said variety of different format discs and generating format specific microinstructions to said high level hardware independent library said format files for configuring said link list.

10. The system of claim 9 wherein said high level format independent library includes data processing routines for reading sector information contained in said variety of different format discs.

11. The system of claim 10 wherein said low level hardware dependent library receives a stream of data from said variety of different format discs and for determining whether said stream of data includes valid MPEG data.

12. The system of claim 11 wherein said low level hardware dependent library includes a programmable media control interface procedure for facilitating communication between said video processing unit and said CD-ROM driver.

13. In a computer system including a processor coupled to a bus, a compact disc unit for handling compact discs, a video processor for processing video data presented by said compact disc unit, a low level hardware dependent driver for interfacing said compact disc unit to said video processor, a high level disc format independent library for interfacing said low level hardware dependent driver to a high level disc format dependent applications program, a method of handling a variety of different format compact discs comprising the computer implemented steps of:

receiving one of said variety of different format compact discs in said compact disc unit;

reading sector information contained in one of said variety of different format compact disc;

comparing said sector information with a link list information database created by said high level format independent library;

writing said sector information into said link list information database when the sector information and the link list information do not match and generating microinstructions responsive to said link list information database for processing in said video processor; and generating video images and accompanying audio responsive to said microinstructions to a display screen.

14. The method described in claim 13 wherein said step of comparing said sector information with said link list information database further comprises the step of determining whether said sector information matches a data string representing a VideoCD format data string indicative of a VideoCD formatted compact disc in said compact disc unit.

15. The method described in claim 14 wherein said step of comparing said sector information with said link list database further comprises the step of determining whether said sector information matches a data string representative of a CD-I format type data.

16. The method described in claim 15 wherein said step of comparing said sector information with said link list information database further comprises the step of configuring sector information to match the format type of a particular compact disc format type not present in said link list information database.

17. The method described in claim 13 wherein step of generating microinstructions includes the step of parsing valid MPEG data from the stream of data received from said compact disc unit.

18. The method described in claim 17 wherein said MPEG data parsing step further includes the step of parsing said stream of data received from said compact disc unit into audio and video microinstructions for loading into said video processor.

19. The method described in claim 13 wherein said low level driver is an MCI driver.

20. The method described in claim 13 wherein said step of generating video images comprises the steps of:

loading up MPEG buffers in said video processor;

reading 2352 bytes of data per sector from said compact disc;

reading sixteen sectors of data at a time from said compact disc;

writing valid MPEG data from said sector data to said video processor.

* * * * *